United States Patent [19]

Mattes et al.

[11] 3,842,317

[45] Oct. 15, 1974

[54] PROTECTED SEMICONDUCTOR CONTROL CIRCUIT

[75] Inventors: Bernhard Mattes, Ludwigsburg; Erich Feigl, Schwieberdingen, both of Germany

[73] Assignee: Robert Bosch GmbH, Stuttgart, Germany

[22] Filed: Oct. 16, 1972

[21] Appl. No.: 298,101

[30] Foreign Application Priority Data
Dec. 24, 1971 Germany.............................. 2164572

[52] U.S. Cl. ............................... 317/33 SC, 317/16
[51] Int. Cl. ............................................... H02h 7/20
[58] Field of Search ............ 317/16, 33 SC; 307/100

[56] References Cited
UNITED STATES PATENTS

| 3,376,478 | 4/1968 | Sheng | 317/16 |
| 3,569,784 | 3/1971 | Carroll | 317/16 |
| 3,571,659 | 3/1971 | Anzai | 317/16 |
| 3,686,530 | 8/1972 | Bogut | 317/33 SC |

*Primary Examiner*—R. Skudy
*Assistant Examiner*—Patrick R. Salce
*Attorney, Agent, or Firm*—Flynn & Frishauf

[57] ABSTRACT

An SCR type switch is connected to short-circuit the control current of the protected semiconductor device when the load current of the latter, which also passes through a sensing resistor, exceeds a maximum permissible value. Several devices can be protected by the same SCR. Reset requires interrupting the current supply to the SCR. The circuit is suitable for motor vehicle electronic controls. A modification provides temperature compensation.

3 Claims, 3 Drawing Figures

PATENTED OCT 15 1974
3,842,317
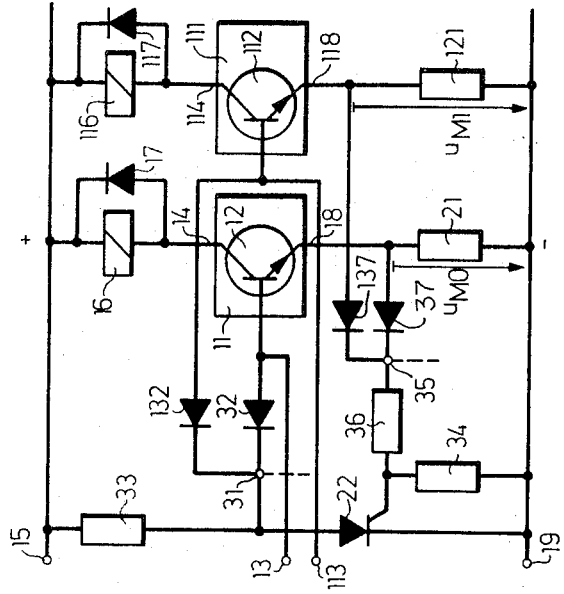
Fig.1
Fig.2
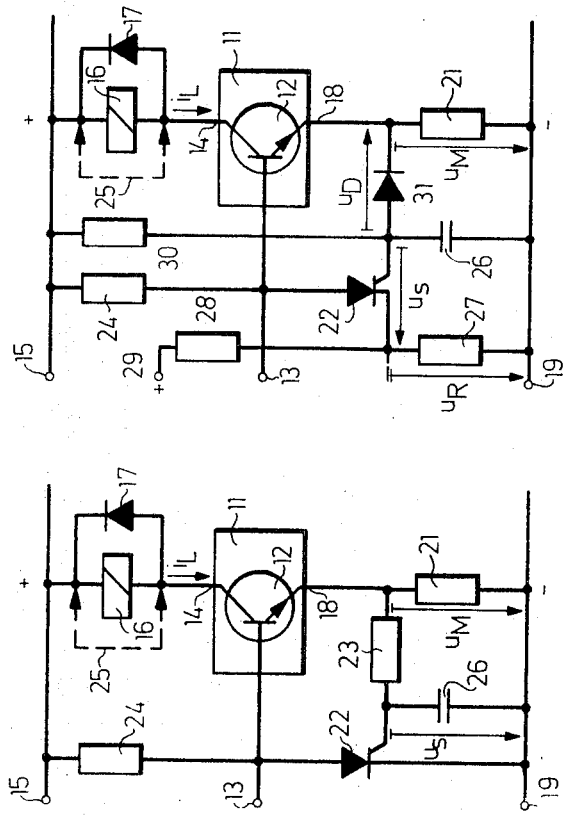
Fig.3

PROTECTED SEMICONDUCTOR CONTROL CIRCUIT

This invention relates to a protective circuit for semiconductor devices and more particularly for semiconductor devices in which the switching or controlled path of the semiconductor device is in the circuit of the controlled apparatus. This protection circuit is particularly suited for application to electronic transmission controls in motor vehicles.

In manufacturing assembly of motor vehicles and in motor vehicle service, erroneous connections of the electrical equipment of the vehicle by inadvertent reversal or interchange of connections is not entirely preventable. It can accordingly occur that a semiconductor device - for example, the Darlington-connected transistor final stage - could be connected with its switching path directly across the terminals of the car battery, if instead of the intended controlled equipment a piece of wire should through some error complete the circuit. In that case the immediate destruction of the semiconductor device by overloading would take place.

The object of this invention is to provide a protective circuit within electronic devices, particularly in motor vehicles, which will protect controllable semiconductor devices against destructive overloading resulting from an excessively high current in its controlled path.

It is possible to provide a resistance in the utilization circuit in series with the control or switching path, preferably between the switching path and the controlled apparatus, which would limit the switching current to a permissible maximum value in the case of a short circuit. Nearly the full battery voltage would be applied across such a resistance in a short circuit case, so that the power rating of the limiting resistor must therefore be very high. The voltage available to the controlled apparatus, moreover, is reduced by this method of protection.

The voltage regulators and current regulators, further arrangements are known that cause the controlled transistor, through which the utilization current passes, to become nonconducting when the utilization current increases above a maximum permissible value. These arrangements are too expensive, however, for application in automotive electronics.

Subject Matter of the Present Invention

Briefly, the switching path of a semiconductor switch is connected in parallel to the control path of the semiconductor device to be protected in order to influence the control current of the latter and the control path of the semiconductor switch, which is preferably a semiconductor controlled rectifier ("thyristor"), is so connected with a sensing resistor in series with the controlled path of the protected semiconductor device as to trip the semiconductor switch when a maximum permissible current is exceeded. Holding current is provided over a resistor to the semiconductor switch to prevent the latter from returning to its original condition until the trouble is checked. In particular, the sensing impedance, which is preferably a resistor, is connected directly in series with the switching path of the protected semiconductor device and the switching path of the protecting semiconductor switch is placed in parallel to the series combination of the sensing resistor and the control path of the protected semiconductor device. The coupling of the junction of the protected semiconductor device and the sensing resistor to the gate of the semiconductor switch may be over a resistor, a diode, or both, and a smoothing capacitor may be provided if the protected semiconductor is not highly sensitive to extremely short current peaks. Coupling by a diode maintained conducting with a small current through a pull-up resistor provides temperature stabilization of the protective circuit.

On the other hand, a diode poled, so that it will be caused to conduct by the voltage across the sensing resistor is useful for coupling a plurality of protected semiconductor devices to a single protecting circuit, because then the diode connected to the sensing resistor having the highest voltage drop will conduct while the others will block. In the case of such multiple protection, the control electrodes (base) of the various protected devices are connected to the semiconductor switch through isolating diodes, which will all conduct when the switch closes.

The invention will be described by way of example with reference to the accompanying drawings, wherein:

FIG. 1 is a basic circuit diagram of a protection circuit according to the invention;

FIG. 2 is a circuit diagram of a protective circuit of the invention with temperature compensation, and FIG. 3 is a circuit diagram of a circuit according to the invention for protection of two or more controllable semiconductor devices.

FIG. 1 shows a semiconductor device 11 which, for example, contains a transistor 12. Instead of the single transistor 12, the semiconductor device 11 could of course also include a number of semiconductor elements connected to each other in some functional way, for example two individual transistors connected in a Darlington circuit.

The base connection 13 of transistor 12 serves as the control connection and is accordingly connected to the electronic control, not shown in the drawing of the semiconductor device, for example the electronic transmission control of a motor vehicle. A controlled apparatus or utilization device, in the illustrated example a relay 16 is connected between the collector connection 14 of transistor 12 and a positive voltage bus 15. A diode 17 in parallel with the coil of relay 16 serves in a well-known way to absorb the reverse voltage peaks that arise when the coil is switched off. A sensing reistor 21 is connected between the emitter connection 18 of transistor 12 and a negative voltage bus 19.

Between base connection 13 and negative voltage bus 19 is a semiconductor controlled rectifier 22. These devices are sometimes called "thyristors" and most commonly SCR's. Between the gate of SCR 22 and emitter connection 18 of transistor 12 is a coupling resistor 23. A resistor 24 is connected between base connection 13 and positive bus 15. This resistor 24 is in parallel with the electronic control circuit not shown in the drawing, which has a certain measurable internal impedance that appears between the terminals 13 and 15. This resistor may hence be referred to functionally as a "parallel resistor." The dashed line 25 indicates a short circuiting of the coil of relay 16.

The control path of SCR 22 can be bridged by a smoothing capacitor 26 between gate and cathode. The control voltage applied to the control path of SCR 22 is designated $u_S$ and the sensed voltage at sensing resistor 21 is designated $u_M$. The load current $i_L$ flows through the collector of transistor 12.

FIG. 2 shows a modification of the protective circuit in which temperature compensation is provided. In FIG. 2 and FIG. 1, the same reference numerals are used for corresponding circuit elements. The cathode of SCR 22 is connected to the division point of a voltage divider which has one component resistor 27 connected between the cathode of SCR 22 and negative bus 19 and its second component resistor connected between the cathode of SCR 22 and the connection terminal 29 of a constant voltage source not shown in the drawing. The anode of SCR 22 is connected to base connection 13 of transistor 12 and between that base connection and positive bus 15 is parallel resistor 24. Smoothing capacitor 26 is connected between the gate of SCR 22 and negative bus 19. Between the gate of SCR 22 and emitter connection 18 of transistor 12 is a diode 31 with its cathode connected to emitter 18. The forward voltage $u_D$ appears across diode 31, since it is connected to positive bus 15 over bias resistor 30, which may be referred to as a pull-up resistor. Between emitter connection 18 of transistor 12 and negative bus 19 is again the sensing resistor 21 and between collector 14 and positive bus 15 the parallel combination of relay 16 and diode 17.

FIG. 3 shows next to the heretofore described protected semiconductor device 11 a further semiconductor device 111 includes a transistor 112 of which the emitter 118 is connected to negative bus 19 over a further sensing resistor 121. A sensed voltage $u_{M1}$ appears across sensing resistor 121. Between base connection 13 of transistor 12 and the anode of SCR 22, which is connected to a junction point 31, is a first diode 32 which provides decoupling. Between base connection 113 of the additional transistor 112 and first junction point 31 is another diode 132 functioning in the same manner as diode 32 (so that the diodes 32 and 132 may be described as belonging to a first set of diodes).

Between positive bus 15 and the previously mentioned junction point 31, which may be described as the first junction point and is connected to the anode of SCR 22, is a bias resistor 33. The cathode of SCR 22 is connected directly to negative bus 19, while between the gate connection of SCR 22 and negative bus 19 is a resistor 34. Between that gate connection and a second junction point 35, a decoupling resistor 36 is connected. Between second junction point 35 and the emitter connections of the protected transistors is a second set of diodes with their cathodes connected to junction point 35. Thus between junction point 35 and emitter connection 18 of transistor 12 is the coupling diode 37, while between junction point 35 and emitter connection 118 of transistor 112 is decoupling diode 137. Still other semiconductor devices can be protected by SCR 22 by connecting their control connections to first junction point 31 over further decoupling diodes of the first set and connecting their emitter connections to second junction point 35 over further decoupling diodes of the second set.

The manner of operation of the various protective circuits is described as follows.

Transistor 12 is put into its conducting condition by current cause to flow through its base connection 13 (by the control circuit not shown) when it is desired to operate relay 16. In this case the load current $i_L$ flows over the switching path 14–18 of transistor 12. Transistor 12 is chosen with such characteristics that it is not over-loaded by the load current $i_L$. A voltage which is with sufficient accuracy proportional to load current $i_L$ can be measured or detected across the sensing resistor 21 which is connected in series with the switching path 14–18 of transistor 12. The greater the load current $i_L$, the greater is also the sensed voltage $u_M$ so measured or sensed. If the sensed voltage $u_M$ across sensing resistor 21 exceeds the ignition potential of SCR 22, an ignition current flows over coupling resistor 23 into the gate of SCR 22. SCR 22 then switches to its conducting condition and remains conducting because of parallel resistor 24. The control current that previously flowed through base connection 13 into transistor 12 now flows directly through the switched path of SCR 22 to the negative bus 19. In consequence transistor 12 is turned off.

Parallel resistor 24 is actually not necessary if the internal resistance of the control circuit (not shown) as measured between terminals 13 and 15 has a small enough value to assure that the holding current of SCR 22 will flow for any condition of the control circuit. The value of the load current at which a protection circuit associated with SCR 22 is triggered may be set by a suitable choice or adjustment of the magnitude of resistor 21. Smoothing capacitor 26 serves to intercept relatively short disturbance pulses which can always be present during operation of a motor vehicle and which in some circumstances would cause a firing of the SCR. Smoothing capacitor 26 is not, however, absolutely necessary.

For the embodiment illustrated in FIG. 2 the following equation holds:

$$u_R + u_S = u_D + u_M$$

In the case of normal loading, i.e., when the load current $i_L$ is less than its highest permissible value, the control voltage $U_s$ is smaller than the ignition voltage necessary to fire SCR 22. If, however, the load current $i_L$ is greater than permissible, the sensed voltage $u_M$ also increases above the predetermined maximum normal value. The forward voltage drop $u_D$ of diode 31 caused by the currents flowing through bias resistor 30 is effectively added to the sensed voltage $u_M$.

From the above relation we have $$u_S = u_D + u_M - u_R$$

In the situation just described above, the control voltage $u_S$ reaches a magnitude exceeding the ignition voltage of SCR 22. The latter then fires and thereby switches off transistor 12.

For a given constant stabilized voltage at connection 29 a value of the load current $i_L$, at which the protective circuit is tripped, may be adjusted by the choice of magnitudes of resistors 27 and 28 of the voltage divider and the choice of value of sensing resistor 21. The forward voltage drop $u_D$ of diode 31 is temperature dependent. The temperature dependence of the ignition voltage of SCR 22 can be compensated by this temperature dependence of $u_D$.

The dashed line 25 in FIGS. 1 and 2 indicates the case in which the winding of relay 16 is short circuited. In such a case the load current $i_L$ naturally increases rapidly to the highest permissible value.

The embodiment illustrated in FIG. 2 is mostly for use in special cases. In motor vehicle equipment, the semiconductor elements mostly used tolerate currents many times the normally observed load current, hence many times the nominal current. In motor vehicles, the semiconductor elements are exposed to very rough use and must accordingly be provided in oversize ratings. Within the electronic equipment of a motor vehicle, moreover, it is sought to use the same types of components so far as possible. That is for the reason that the individual circuit component can be produced more cheaply in large batches with units having the same ratings and substantially the same characteristics. For this reason, also, most of the circuit elements are operated far below their maximum ratings. Hence the termperature dependence of the protection circuit shown in FIG. 1 is not at all troublesome for use in a motor vehicle, and the simpler and cheaper circuit of FIG. 1 is generally quite adequate.

It is possible to connect a number of semiconductor devices to be protected to a single protection circuit. An example of such an arrangement is illustrated in FIG. 3, in which again circuit elements which are the same as those of FIG. 1 or FIG. 2 are provided with the same reference numerals. The base connections 13,113 of the individual controllable semiconductor devices connected with the first junction point 31 over decoupling diodes 32,132, etc., of the first set of diodes, junction point 31 being connected with the anode of SCR 22 as previously mentioned. The emitter connections 18,118, etc., are connected to the second junction point 35 over diodes 37,137, etc., of the second set. Between junction point 35 and the gate of SCR 22 is connected a decoupling resistor 36, which together with resistor 34 forms a voltage divider. If now, any of the protected semiconductor devices, for example the semiconductor device 111, is overloaded, the sensed voltage $u_{M1}$ rises above the predetermined critical value and an ignition current flows decoupling diode 137 of the second set and decoupling resistor 36 into the gate of SCR 22. The latter fires and switches to its conducting condition. In consequence, the potential of first junction point 31 becomes substantially negative, i.e., almost equal to the potential of negative bus 19, whereby all the semiconductor devices 11,111, etc., are switched off. SCR 22 remains conducting because its holding current can flow over bias resistor 33.

The circuit of this invention for protection of a controllable semiconductor device is very simply built and cheap to manufacture. It involves in essence only one SCR and two resistors. The protective circuit can simultaneously serve to protect several controllable semiconductor devices. A low power plastic encapsulated SCR can be incorporated in the circuit as the necessary SCR, for example. The components of the protective circuit can be located in the immediate neighborhood of the final stage of the protector device, which is particularly advantageous for the design and construction of printed circuits. The further advantage is that after the occurrence of an overload, the protective circuit continues to hold the semiconductor device under protection in its switched off condition after the disturbance is cleared. This assures that the malfunction will be investigated and, indeed, makes it possible to know where to start looking. The SCR of the protective circuit can be extinguished only by briefly cutting off the supply voltage.

We claim:

1. An overcurrent protected semiconductor control circuit for a plurality of simultaneously controlled apparatus comprising, in combination:
   a plurality of controllable semiconductor devices (11, 111) each having a controlled path connected in series with a controlled apparatus (16, 116) and a controlling path at one end of which is a control electrode;
   connections (13, 113) to the respective control electrodes of said semiconductor devices (11,111) for application of control signals for normally controlling the respective apparatus (16, 116);
   sensing impedences (21, 121) connected respectively in series with said controlled paths of said semiconductor devices (11, 111);
   a normally open semiconductor switch (22) having a switching path in parallel with the controlling paths of said devices (11, 111);
   a first set of diodes (32, 132) associated on a 1 to 1 basis with said controllable semiconductor devices (11, 111), with the cathodes of all said dides of said first set (32, 132) connected to the anode of said semiconductor siwtch (22), while the respective anodes of said diodes of said first set (32, 132) are connected to the respective base connections of said controllable semiconductor devices (11, 111);
   a second set of diodes (37, 137) the anodes of which are respectively connected to the emitter connections (18, 118) of said controllable semiconductor devices (11, 111); and
   a voltage divider (34, 36) connected at one end to a common connection of the cathodes of said diodes (37, 137) of said second set of diodes and its other end connected to a negative voltage point of the circuit and with its tap connected to the control electrode of said semiconductor switch (22), whereby said semiconductor switch (22) is arranged to shortcircuit the controlling paths of said semiconductor devices (11, 111) in response to a magnitude of current exceeding a predetermined magnitude in any of said sensing impedences (21, 121).

2. A protected semiconductor control circuit as defined in claim 1 in which said semiconductor switch (22) is a semiconductor controlled rectifier and in which the common connection of the cathodes of said second set of diodes (37,137) is connected to the control electrode of said semiconductor controlled rectifier over part of said voltage divider (36).

3. An overcurrent protected semiconductor control circuit for a controlled apparatus having a positive voltage bus and a negative voltage bus comprising, in combination:
   a controllable semiconductor device (11) having a controlled path connected in series with said apparatus and a controlling path at one end of which is a control electrode;
   a connection to said control electrode of said controllable semiconductor device for application of control signals for normally controlling said apparatus;
   a sensing impedance (21) connected in series with said controlled path between the emitter of said device (11) and said negative voltage bus (19);
   a normally open semiconductor controlled rectifier (22) having its cathode connected to said negative voltage bus (19) and a switching path in parallel with the controlling path of said device (11) in such manner as to directly short-circuit said controlling path of said device when said switching path is switched to conducting condition;

resistor means (24) connected between said positive voltage bus (15) and the anode of said semiconductor controlled rectifier (22), and means responsive to a magnitude of current in said sensing impedance exceeding a predetermined magnitude for closing said switching path of said semiconductor switch and thereby directly short-circuiting said controlling path of said device (11) and reducing the current in said controlled path, said last-mentioned means being arranged for temperature stabilization by being provided with a stabilized voltage source having a positive connection (29) at a positive voltage stabilized with respect to said negative bus (19);

a voltage divider (27,28) connected between said negative voltage bus (19) and said positive connection (29) of said stabilized voltage source;

connection of the cathode of said semiconductor controlled rectifier (22) to a voltage division point of said voltage divider (27,28);

a bias resistor (30) connected between said positive voltage bus (15) and the gate of said semiconductor controlled rectifier (22), and a diode (31) connected in its conducting direction between said gate of said semiconductor controlled rectifier (22) and the emitter connection (18) of said semiconductor device (11).

* * * * *